United States Patent

[11] 3,561,574

[72] Inventors Richard H. Dickinson, Jr.
Shaker Heights;
William A. Gail, Northfield, Ohio
[21] Appl. No. 819,184
[22] Filed Apr. 25, 1969
[45] Patented Feb. 9, 1971
[73] Assignee McDowell-Wellman Engineering Company
Cleveland, Ohio

[54] FLUID FLOW CONTROL DEVICE
17 Claims, 5 Drawing Figs.
[52] U.S. Cl............................................................ 188/97;
137/109, 137/110
[51] Int. Cl............................................................ F16d 57/00
[50] Field of Search............................................ 137/109,
110; 188/87, 88.51, 97, 97.1

[56] References Cited
UNITED STATES PATENTS
3,106,992  10/1963  Sherburne....................  188/87

*Primary Examiner*—Robert G. Nilson
*Attorney*—McNenny, Farrington, Pearne and Gordon

ABSTRACT: There is provided a fluid flow control device which is particularly useful in hydraulic shock absorber or damping devices, and characterized by a circuit attachable to a system where fluid moves under pressure in either of two directions. This circuit includes a pair of constrictions of considerably different resistance to fluid flow in series with each other. Bypass means are provided around one constriction which function to render such restriction inoperative when predetermined pressure conditions exist.

PATENTED FEB 9 1971
3,561,574
SHEET 1 OF 2
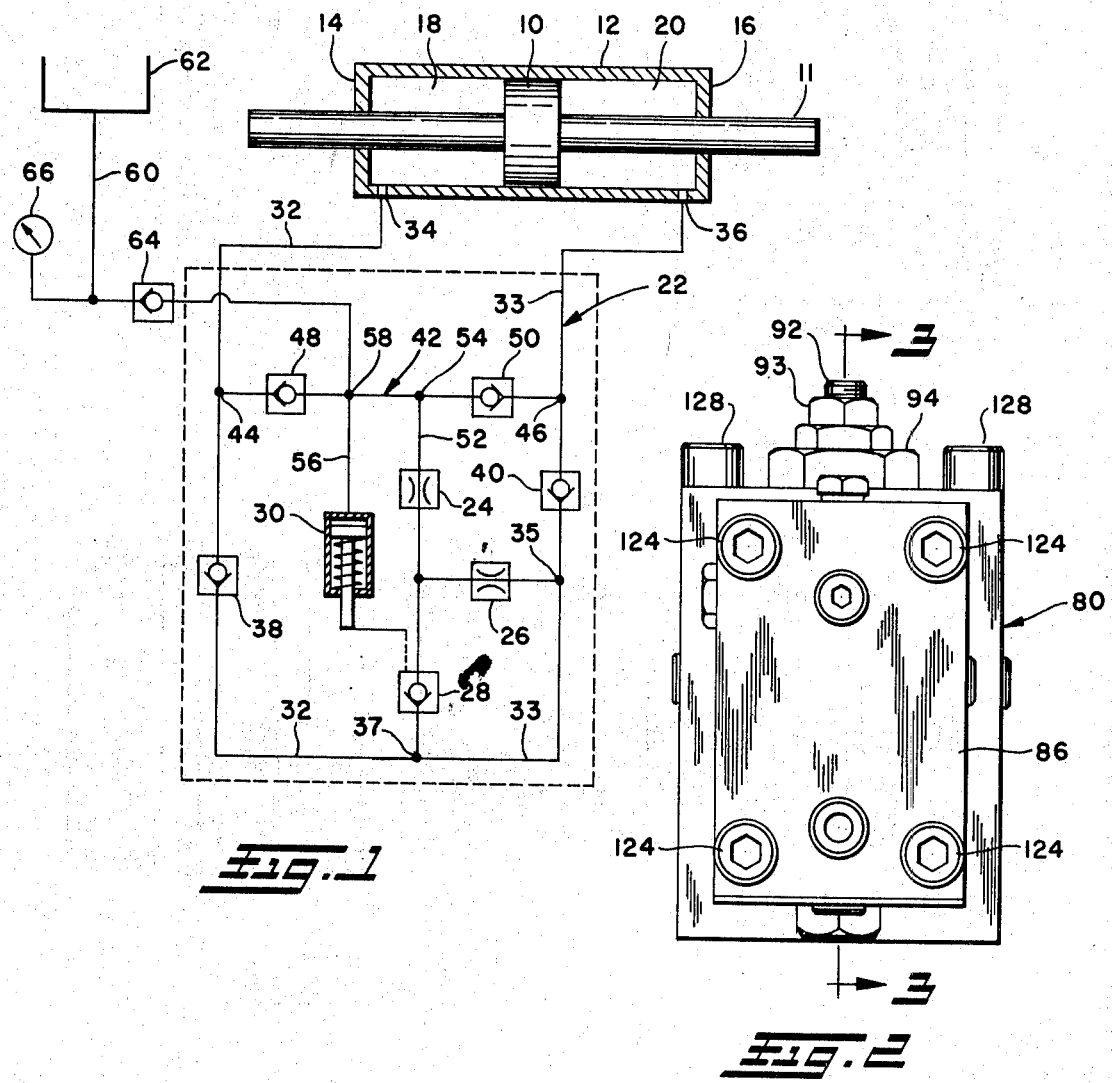
Fig.1
Fig.2
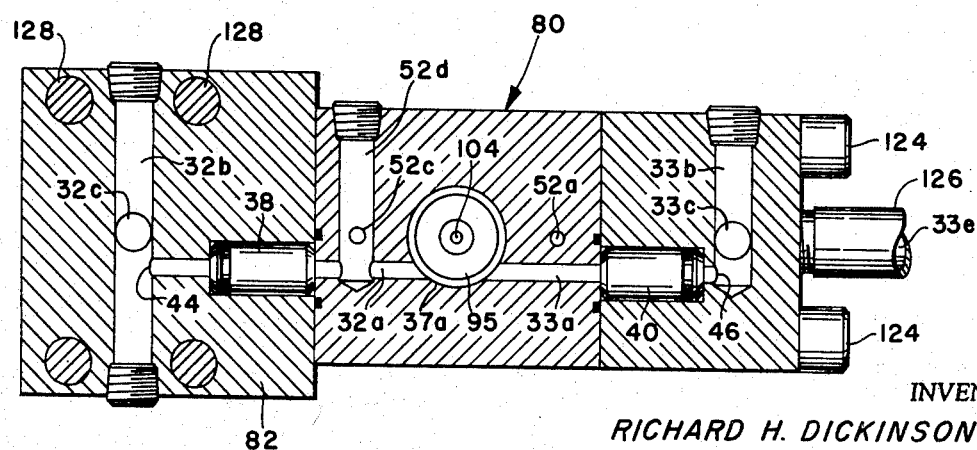
Fig.4
INVENTOR
RICHARD H. DICKINSON, JR.
WILLIAM A. GAIL
BY
McNenny, Farrington, Pearne & Gordon
ATTORNEYS

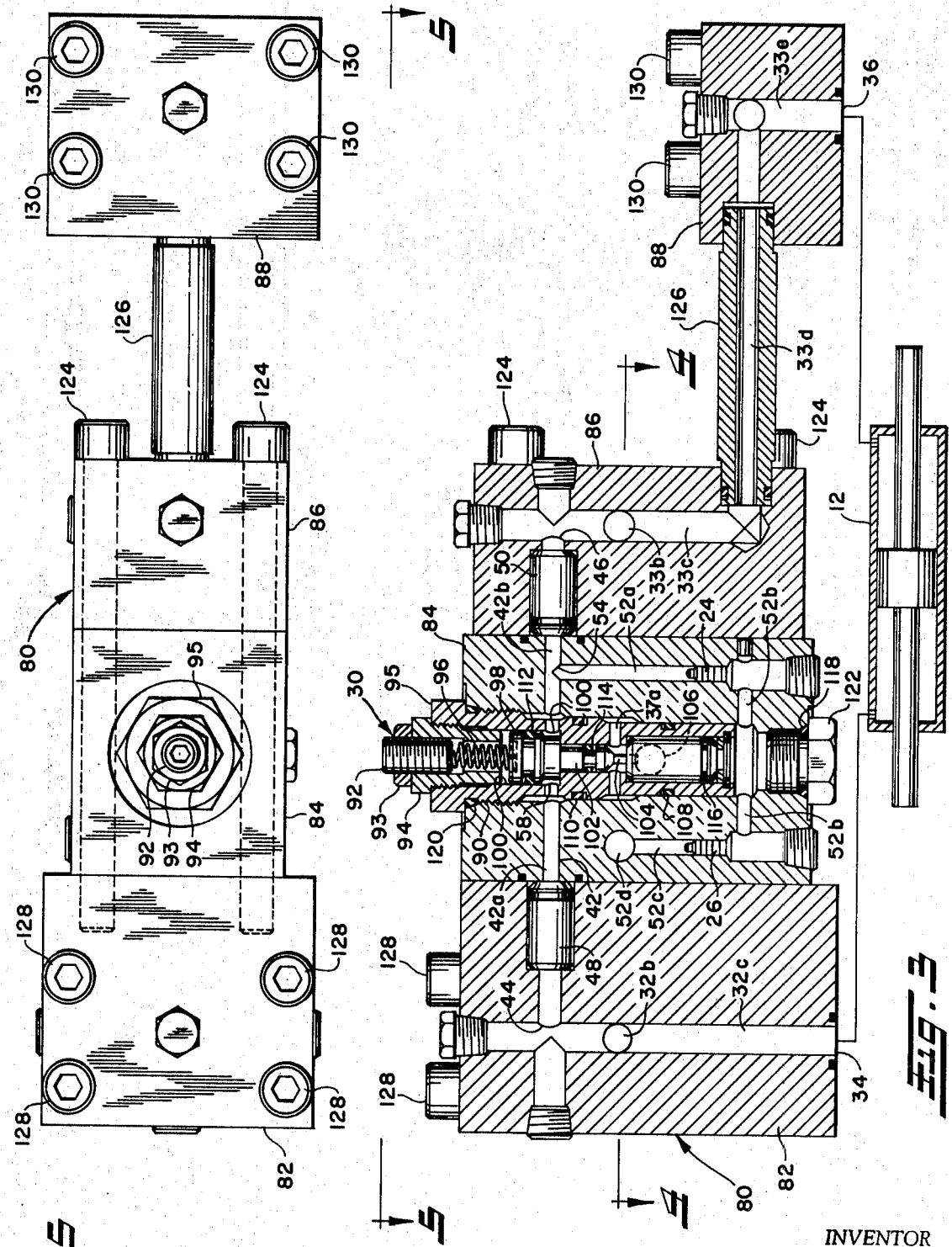

3,561,574

FLUID FLOW CONTROL DEVICE

BACKGROUND OF INVENTION AND PRIOR ART

This invention relates to a fluid control system which is particularly useful in combination with hydraulic shock-absorbing or-damping devices on braces for equipment, e.g. a sway brace, which equipment is otherwise supported but subject to movement. In equipment installations such as fluid-handling systems including pipelines or liquid vessels, it is often necessary to protect the equipment from sudden shock loads which might otherwise cause damage to the equipment. At the same time such control apparatus should be capable of permitting relatively slow movement of the equipment over a predetermined range of movement due to thermal expansion or contraction in response to normal temperature changes in or around the system. Even relatively mild shocks should be permitted to be transmitted to or from the equipment so long as they are below a predetermined level. The bracing apparatus in such an embodiment should be designed, however, to protect the equipment against relatively violent shocks. These devices support no load, offer small resistance to normal movement, but provide efficient damping under abnormal force conditions which could otherwise cause large movement and resulting damage to equipment.

Numerous devices have been suggested for such purposes, notably that shown in U. S. Pat. No. 3,106,992. The present invention represents an improvement upon the device there shown both as to structure and as to mode of operation. Other structures related thereto include Mitereff U. S. Pat. No. 2,375,377 and Funkhouser U. S. Pat. No. 2,869,685.

The present invention provides a simplified and efficient structure characterized by freedom from opposing spring control means, and provision for unidirectional flow of fluid through constrictions or orifices whereby the characteristics of fluid flow are constant and independent of direction of fluid flow in the main circuit, as will become clear upon reference to the annexed drawings.

BRIEF STATEMENT OF INVENTION

Briefly stated, the present invention is in a fluid flow control device for a damper. It is particularly adapted for attachment in a hydraulic damping device to isolated sources of fluid under pressure to regulate fluid flow in either of two directions therebetween. The control device comprises in combination, a circuit including a pair of constrictions of different resistance to fluid flow in series with each other. In parallel with one of said constrictions, there are provided fluid pressure-actuated bypass means operable at a predetermined fluid pressure to control flow of fluid through said one constriction. The circuit also includes fluid flow control means coacting in the circuit to provide unidirectional fluid flow through the constrictions independently of the direction of fluid movement in the isolated sources of fluid under pressure. As indicated above, this control device is particularly adapted for use with sway braces or shock absorbers for bracing members used in stabilizing apparatus such as piping or vessels relative to a rigid support. The mode of installation of these devices as sway braces is well understood by those skilled in the art and further elaboration is deemed unnecessary.

BRIEF DESCRIPTION OF DRAWINGS

In the annexed drawings:

FIG. 1 is a diagrammatic representation of the hydraulic circuit embodied in the device shown in FIGS. 2—5 inclusive.

FIG. 2 is an end view of a structure embodying the present invention omitting, however, the details of a high-pressure fitting.

FIG. 3 is a cross-sectional view of the device shown in FIG. 2 as it appears in the plane indicated by the numerals 3–3.

FIG. 4 is a transverse cross-sectional view of the device shown in FIG. 2 as it appears in the plane indicated by the numerals 4–4.

FIG. 5 is a top plan view of the device shown in FIG. 2 including, however, the high-pressure fitting omitted from FIG. 2.

DETAILED DESCRIPTION OF DRAWINGS

The physical embodiment shown in FIGS. 2—5 is a preferred embodiment of the invention shown in diagrammatic form in FIG. 1, and description of FIG. 1 preliminary to a description of the specific embodiment will render the subject matter clearer.

Accordingly, FIG. 1 shows in diagrammatic form a "suppressor" cylinder and piston which is conveniently a component of a sway brace otherwise of a conventional design, for example as shown in the U. S. Pat. No. 3,106,992. The cylinder is adapted for attachment to either the support, or the equipment being supported, and the piston which is relatively moveable with respect to the cylinder is adapted for attachment, respectively, to either the equipment being supported, or the support. A piston 10 is provided which is relatively movable in a cylinder 12 and defines in respect of the cylinder heads 14 and 16, isolated fluid chambers 18 and 20, respectively. The piston 10 is connected to a piston rod 11 which extends through both cylinder heads 14 and 16 so that the total volume of both chambers 18 and 20 is substantially constant regardless of the position of piston 10. When the piston 10 is caused to move relative to the cylinder 12 under either shock-loading conditions or nonviolent loading conditions, the fluid in the respective chambers 18 and 20 is submitted to a pressure differential which causes fluid to flow in the external circuit, generally indicated at 22. It is in the external circuit 22 that the present invention lies.

The external circuit 22 is characterized by a pair of constrictions 24 and 26 in the line which are in series with each other. These constrictions are of different resistance to fluid flow. In the preferred embodiment, the constriction or orifice 24 is of relatively lower resistance to fluid flow than the constriction 26. For example, the orifice 24 may have a fluid rating of 500 Lohms, and the orifice 26 a rating of 9,000 Lohms. (The term "Lohm" is a measurement of resistance to fluid flow useful in connection with orifices having a very high amount of restriction of such a nature that they tend to act as a fixed resistance regardless of the pressure drop or rate of flow. The term "Lohm" is defined so that a resistance of 1 Lohm will allow the flow of 100 gallons of water per minute with a pressure drop of 25 p.s.i. at a temperature of 80° F. Thus, an orifice having a rating of 500 Lohms will permit the flow of 0.2 gallons per minute of water at a pressure drop of 25 p.s.i. at a temperature of 80° F., and at a pressure drop of 1,000 p.s.i. it will allow a flow of 8 gallons per minute.) Generally the difference in fluid flow resistance between the orifices 24 and 26 should be a factor of an order of from 2 to 100 times the lower flow resistance (larger orifice). The size of the larger orifice 24 is determined to be that which at the minimum fluid flow rate to be protected against produces a pressure drop across orifice 24 sufficient to actuate the pressure responsive device 30. One of these orifices, preferably the smaller, is provided with bypass means and in the specific embodiment of the invention includes a fluid gate 28 which may be bidirectional, although preferably a check valve, operating in parallel with the smaller constriction or orifice. The gate 28 is normally open and thus allows fluid to pass relatively freely through orifice 24, the large bulk of the fluid exiting through the gate 28 instead of attempting to pass through the smaller orifice 26. In this condition, then, normal vibrations, thermal forces, and the like, are accommodated at a relatively slow rate of flow of fluid occasioned by the relatively slow movement of piston 10 relative to cylinder 12.

The gate 28 is desirably maintained in a normally open condition by a pressure-responsive device such that while the pressure on the fluid in the system remains below a predetermined level, e.g. 10 p.s.i., the gate 28 is open. However, should the pressure in the system exceed such a predetermined level, the pressure-actuated means is operated and the gate 28 is closed. Thus, where the gate 28 is a check valve held in normally open position by the pressure-responsive means 30, actuation of the pressure-responsive means 30 permits the check valve 28 to close, thereby forcing fluid to move through the resistance orifice 26.

The balance of the circuit is composed of fluid lines and gates which are operative to maintain the flow through the orifice 24 and the parallel system including the orifice 26 in one direction only. Thus, the circuit 22 includes a first fluid conduit 32 secured at 34 in communication with the fluid in the chamber 18 of the cylinder 12. A second fluid conduit 33 is secured at 36 in fluid communication with the fluid contained in the chamber 20 of the cylinder 12. The conduits 32 and 33 are joined, as for example at point 37, to form a closed loop. At a point between the attachment point 34 and the juncture 37 in the line 32 there is provided a unidirectional fluid gate 38 disposed to permit fluid flow in a direction from the point 37 toward the attachment point 34 and to prevent flow in the opposite direction. Likewise, in the fluid conduit 33 there is provided a unidirectional gate 40 intermediate its extremities 36 and 37. This gate is also disposed to permit flow only in the direction from the point 37 to the point 36 and is located between the point 36 and the juncture 35 between the orifice 26 and the conduit 33. Thus the junctures 35 and 37 are connected by an unobstructed portion of conduit 33.

The circuit is completed by a bridging conduit generally indicated at 42 and communicating with the conduit 32 at a point 44 which is intermediate the gate 38 and the point 34. Likewise, on the other side of the circuit, the conduit 42 joins the conduit 33 at a point 46 which is intermediate the gate 40 and the point 36. The conduit 42 is also provided with a pair of gates 48 and 50 disposed in back-to-back relation, but each permitting flow in a direction towards a point between the gates 48 and 50.

Intermediate the gates 48 and 50 the conduit 42 communicates with a conduit 52 which contains the orifices 24 and 26 in series at a juncture 54 which is located between the gates 48 and 50. The gates 48 and 50 are arranged so as to permit fluid flow toward the juncture 54 and to restrict or prevent flow from juncture 54 toward points 34 and 36, respectively.

The arrangement of the gates 38, 40, 48 and 50, it will be observed, is such that regardless of the direction of movement of the piston 10 in the cylinder 12, fluid will always be forced to flow in a direction from the juncture 54 to the juncture 37. Thus, the characteristics of fluid flow through the orifices 24 and 26 will be the same regardless of the direction of movement of the piston 10 relative to the cylinder 12.

Pressure-actuated means 30 are connected by means of a conduit 56 to the conduit 42 at a juncture 58. Also for convenience, makeup fluid may be admitted to the circuit at a juncture 58 through a reservoir feed line 60 which communicates between a reservoir 62 and the juncture 58. The conduit 60 contains a suitable unidirectional fluid gate 64 which allows fluid to flow from the reservoir 62 into the system but prevents flow in the opposite direction. A pressure gauge 66 is also included in the system for convenience.

DESCRIPTION OF OPERATION

In the apparatus shown diagrammatically in FIG. 1, the cylinder 12 may be secured to a stationary support (not shown), and the piston 10 through its projecting rod portion 11 may be secured to a device to be braced (not shown). Let us assume first the imposition of forces causing the fluid in the chamber 18 to become pressurized. This pressurization occurs under two conditions; namely (a) imposition of ordinary forces, e.g. thermal or simple ground vibrations, and (b) imposition of shock-loading forces, e.g. an explosion. Movement of the piston 10 toward the cylinder head 14 will cause fluid to flow through fitting 34 into fluid conduit 32 at a rate which is dependent upon the nature of the force imposing condition. The fluid gate 38 operating in response to the elevated pressure in the fluid conduit 32 remains closed. Fluid therefore flows into the bridging conduit 42 and through the fluid gate 48 which allows fluid under pressure to pass inwardly toward the center of the conduit 42.

The unidirectional fluid gate 50 in response both to the increased pressure in the conduit 42 and the reduced pressure on the fluid in the conduit 33 with which it is connected remains closed. Accordingly, fluid under pressure is now forced through the juncture 54 into the conduit 52 and thus through the orifice 24. Now, the two subconditions postulated in the assumptions above are considered:

The pressure-responsive means 30 is, as will be described hereinafter more particularly, an adjustable device which permits manual setting of the pressure at which this element becomes operative, e.g. 9–10 p.s.i. At fluid flow rates in the circuit productive of a pressure drop across orifice 24 below this level, the pressure-responsive device maintains the unidirectional valve 28 in the open fluid bypass condition. Thus, under the first condition, i.e. normal loads, wherein the line pressure never exceeds the predetermined set limit, e.g. 9–10 p.s.i., the gate 28 remains open and fluid will then flow from the juncture 54 through the conduit 52 and the large restriction 24 through the unidirectional gate 28 maintained in the normally opened position to the juncture 37, bypassing the relatively smaller orifice 26 and thus offering low resistance to movement or damping. The fluid will then return through the fluid conduit portion 33 into the opposite, low-pressure chamber 20 through a fitting 36. The gate 40 in response to the pressure differential created in the system opens to allow fluid to flow in such direction back into the chamber 20 in the cylinder 12. The gate 50 will remain closed as indicated above.

Assuming the second condition with respect to the chamber 18, i.e. a shock-loading condition, the fluid pressure in the chamber 18 greatly exceeds the 9–10 p.s.i. limit and may approach 5,000 p.s.i. Again, the fluid gates 38 and 48 operate in the same manner and fluid flows due to the movement of the piston 10 in cylinder 12 now at a much higher pressure and correspondingly much higher rate. In this circumstance, the pressure-responsive means 30 is actuated, and the fluid gate 28 is closed whereby fluid is forced not only through the larger orifice 24 but also through the smaller orifice 26 and is returned to the conduit 33 in the same manner as indicated above for low-pressure operation. In this condition, there is a high rate of energy absorption in the pressure drop across the orifices 24 and 26 and hence a high damping effect.

As will be observed from the diagram of FIG. 1, when the chamber 20 is pressurized under either of the two conditions, i.e. normal loads or shock loads, the general operation of the system is virtually identical with the exception that the fluid always flows through the conduit 52 in the same direction because of the disposition of the fluid gates in the external circuit 22. In the same manner the pressure-responsive device 30 is actuated or not actuated, as the case may be, to either close the normally open fluid gate 28, or to allow it to remain open and thus bypass the smaller orifice 26.

The orifice 26 serves an additional function in the present devices in providing a bleedoff port to prevent hydraulic lockup of the pressure-responsive means 30.

Loss of fluid in the system is made up from a reservoir 62 communicating to the system through the fluid gate 64 which is also unidirectional, introduction into the system being conveniently at a juncture 58, although any convenient point of introduction into the system may be employed.

The effect of the device is to exert little damping effect of fluid flowing in a relatively open circuit when the loads upon the system are within a minimum range sufficient to accommodate normally experienced loads, e.g. thermal loads, ground vibrations, etc. However, when these loads are exceeded, as by explosion or fluid hammer effects in the apparatus being supported, damping of these forces is effected by causing fluid to move at a high rate and through a small orifice under very high pressure thereby absorbing through such fluid movement the effects of the shock loading upon the system.

Thus, assuming orifice 24 has a resistance of 500 Lohms and orifice 26 a resistance of 9,000 Lohms and the resistance of the rest of the circuit is minimal, the closing of the gate 28 raises the total resistance from 500 Lohms to 9,500 Lohms or by a factor of 19. When the resistance is only 500 Lohms at the maximum pressure differential of 10 p.s.i. and assuming the fluid is water at a temperature of 80° F., the flow will be 0.08 gallons per minute. When the gate 28 is closed to increase the resistance to 9,500 Lohms, the pressure must rise to 190 p.s.i. to maintain the flow at 0.08 gallon per minute and at a pressure of 5,000 p.s.i., the flow will be only 2.1 gallons per minute.

It becomes convenient at this point to describe a physical embodiment of the system above described, it being understood that this embodiment is but a preferred mode of incorporating the subject matter of the present invention.

DESCRIPTION OF PREFERRED EMBODIMENT

Referring now more particularly to FIGS. 2—5 inclusive, there is here shown a housing generally indicated at 80. Conveniently, the housing 80 is composed of separate blocks 82, 84 and 86 for aid in assembly and location of the operative components. In referring to FIGS. 2—5 inclusive, numbers corresponding to those used in FIG. 1 will be used to indicate specific embodiments of devices represented in FIG. 1. Small arabic letters after a number indicate a portion of the correspondingly numbered conduit or line in FIG. 1.

With particular reference to the central housing block 84, there is provided a cross bore 42a–42b which communicates with a transverse bore 52a containing therein a relatively large orifice 24. The cross bore 52b communicates with a bore 52a and with a transverse bore 52c which in turn contains the relatively small orifice 26. The bore 52c returns then to the conduit 52d for ultimate return to cylinder 12.

The housing block 84 contains a centrally disposed stepped transverse bore 90 into which is inserted an assembly including a check valve 28 and a spring-biased hydraulic pressure-actuated device generally indicated at 30 for maintaining check valve 28 in the normally open position. The pressure-actuated means 30 includes a low pressure adjusting screw 92 threadably secured in a bushing 94 and locked in position by a lock nut 93, and bushing 94 is carried in turn in a threaded cylinder body 95. The bushing 94 contains a spring 96 which coacts between the single adjusting screw 92 and a hydraulic piston 98. The hydraulic piston 98 moves a limited distance in the cylinder 100 which is in fluid communication with the cross bore 42 and provides a single pressure-activatable surface operable irrespective of the direction of movement of the piston 10 in the cylinder 12 in contradistinction to prior art devices. Thus, the piston 98 moves in opposition to the biasing spring 96 when the pressure in the cross port 42 exceeds the biasing force of the spring 96. The piston 98 is provided with a pin support 102 and a pin 104 coacting between the support 102 and the ball 106 in the check valve 28 whereby the ball 106 is held in the unseated position and the check valve 28 is therefore normally open. When the pressure in the cross port 42 exceeds the predetermined limit set by the low-pressure adjusting screw 92, the piston 98 moves in the cylinder 100 toward the adjusting screw 92, so displacing the pin 104 as to permit the ball 106 to seat and thus close the valve 28. When the valve 28 is closed, fluid which would normally flow through the cross port 52b through the valve 28 and into the port 37a is forced through the small orifice 26 in parallel therewith. Suitable sealing means such as O-rings 108, 110, 112, 114, 116, 118, 120 are provided to effect suitable sealing within the transverse bore 90 and the bores within the various bushings contained within the bore. A suitable closure plug 122 is provided for the opposite end of the bore 90.

The housing block 82 which is suitably bored and plugged in a known manner is provided for retaining the check valves 38 and 48 and to communicate from port 37a through conduit portions 32a, 32b, and 32c through the fitting 34 to the cylinder 12.

In like manner, the housing block 86 also suitably bored and plugged is provided to retain the check valves 40 and 50 and to communicate from port 37a through the portion of conduit 33 indicated at 33a, 33b and 33c. The blocks 82, 84 and 86 are conveniently bolted together as by bolts 124. In the embodiment shown, a feed line 126 containing a conduit portion 33d extends from conduit portion 33c in the housing block 86 to the housing block 88. The feed line 126 is of predetermined length to dispose the housing block 88 suitably relative to the suppressor cylinder 12. The housing block 88 contains conduit portion 33c in communication with conduit portion 33d and is connected to the cylinder 12 through the fitting 36. The mode of securing the housing block 82 and the housing block 88 to the cylinder 12 may be any convenient mode, although as shown in FIGS. 2 and 4, bolts 128 are utilized to fasten the housing block 82 to the cylinder 12 and bolts 130 are utilized to fasten the housing block 88 to the cylinder 12.

The mode of operation of the apparatus described in FIGS. 2—5 is that which has been described above in reference to FIG. 1.

We claim:

1. A damping device for controlling reversible fluid flow between a pair of isolated sources of fluid under pressure comprising:
   a. a fluid circuit interconnecting said fluid pressure sources and including a pair of constrictions providing a resistance to fluid flow in series with each other;
   b. selectively operable bypass means in parallel with one of said constrictions and in series with the other constriction operable below a predetermined fluid pressure to bypass fluid flow around said one constriction; and
   c. said bypass means including valve means operable responsive to the higher pressure in either of said pressure sources to close said bypass above a predetermined pressure level and to open said bypass when said high pressure is below said predetermined pressure level.

2. A damping device as set forth in claim 1 wherein said constrictions have different valves of resistance and said bypass means is in parallel with the constriction of higher resistance.

3. A damping device as set forth in claim 1 wherein:
   a. said valve means includes a single pressure responsive means; and
   b. unidirectional flow control means operable responsive to fluid pressure to connect said pressure responsive means to the pressure source having the higher pressure.

4. A damping device as set forth in claim 1 wherein said fluid circuit provides the only fluid interconnection between said fluid pressure sources.

5. A damping device as set forth in claim 3 wherein said unidirectional flow control means provide unidirectional flow through said pair of constrictions independently of the direction of flow between said fluid pressure sources.

6. A damping device including fluid flow control means for attachment to isolated sources of fluid under pressure to regulate fluid flow in either of two directions therebetween comprising in combination:
   a. a circuit including a pair of constrictions of different resistance to fluid flow in series with each other;
   b. fluid pressure-actuated bypass means in parallel with one of said constrictions operable at a predetermined fluid pressure to control flow through said one constriction; and
   c. fluid flow control means coacting in said circuit to provide unidirectional fluid flow through said constrictions independently of the direction of fluid movement in said isolated sources of fluid under pressure.

7. A device in accordance with claim 6 wherein the bypass means comprises a unidirectional fluid gate.

8. A device in accordance with claim 6 wherein the constrictions are arranged in downstream order of increasing resistance to fluid flow.

9. A device in accordance with claim 6 wherein the bypass means is in parallel with the constriction of higher resistance to fluid flow.

10. A device in accordance with claim 6 wherein the bypass means includes means for adjusting the fluid pressure at which said bypass means is actuated.

11. A device in accordance with claim 6 in which the bypass means is normally open.

12. A device in accordance with claim 6 in which the bypass means includes a check valve.

13. A device in accordance with claim 6 in which the bypass means comprises a fluid gate and a fluid pressure-responsive actuator coacting with said gate to maintain said gate open below a predetermined fluid pressure and to close said gate above said predetermined pressure.

14. A device in accordance with claim 13 wherein the fluid pressure-responsive actuator is a piston movable in a cylinder and the cylinder is in parallel fluid communication with the circuit including the pair of constrictions of different resistance at a point upstream of said constrictions.

15. A damping device including fluid flow control means, said means comprising in combination:
 a. a pair of first fluid conduits in fluid communication with each other at adjacent extremities, said conduits having free extremities adapted for attachment to isolated sources of fluid under pressure, respectively;
 b. a unidirectional fluid gate in each of said first conduits intermediate its extremities, said gate opposing fluid flow toward said adjacent extremities, respectively;
 c. second fluid conduit means extending between and communicating with each of said first fluid conduits at a point between said fluid gate and the free extremity thereof;
 d. said second fluid conduit means including a pair of unidirectional flow gates in spaced relation, the direction of fluid flow through said gates being opposite and inwardly from each of said first fluid conduits;
 e. bridging fluid conduit means communicating from a point intermediate said pair of oppositely directed fluid gates in said second fluid conduit means to at least one of said first fluid conduits and between the unidirectional fluid gate in said first fluid conduit and the adjacent extremity thereof;
 f. said bridging conduit means including a pair of constrictions of different resistance to fluid flow in series with each other; and
 g. pressure-responsive fluid gate means in parallel with at least one of said constrictions and operable in response to a fluid pressure differential between said isolated sources below a predetermined level to bypass said at least one of said constrictions.

16. A device in accordance with claim 15 wherein the pressure-responsive fluid gate means includes:
 a. a normally open unidirectional fluid gate in parallel with at least one of said constrictions, and
 b. fluid pressure-responsive means coacting between and bridging conduit means and said normally open fluid gate for actuating said fluid gate to a closed position at a predetermined fluid pressure.

17. A device in accordance with claim 16 in which the fluid pressure-responsive means (b) includes means for manually adjusting said predetermined fluid pressure.